US012586851B2

(12) United States Patent
Augustdörfer et al.

(10) Patent No.: US 12,586,851 B2
(45) Date of Patent: Mar. 24, 2026

(54) BATTERY ARRANGEMENT AND METHOD FOR PRODUCING A BATTERY ARRANGEMENT

(71) Applicant: Dr. Ing. h.c. F. Porsche Aktiengesellschaft, Stuttgart (DE)

(72) Inventors: Marco Augustdörfer, Leonberg (DE); Hubert Stadtfeld, Bretten (DE); Gregor Wolf, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 739 days.

(21) Appl. No.: 17/744,976

(22) Filed: May 16, 2022

(65) Prior Publication Data

US 2022/0376334 A1      Nov. 24, 2022

(30) Foreign Application Priority Data

May 18, 2021     (DE) ..................... 10 2021 112 775.0

(51) Int. Cl.
H01M 50/209          (2021.01)
H01M 50/291          (2021.01)

(52) U.S. Cl.
CPC ....... H01M 50/209 (2021.01); H01M 50/291 (2021.01); *H01M 2220/20* (2013.01)

(58) Field of Classification Search
CPC .. H01M 50/20; H01M 50/202; H01M 50/204; H01M 50/207; H01M 50/209;

(Continued)

(56) References Cited

U.S. PATENT DOCUMENTS 3,769,095 A * 10/1973 Schmidt .............. H01M 50/209
                                                                429/151
10,581,040 B2     3/2020 Pflueger et al.
(Continued)

FOREIGN PATENT DOCUMENTS

CN          101521294 A  *  9/2009
CN          101521294 B  *  5/2011   ............. B23K 35/00
(Continued)

OTHER PUBLICATIONS

Oxford English Dictionary Definition of "Encircle", Accessed May 5, 2025.*

(Continued)

*Primary Examiner* — Marla D Mcconnell
*Assistant Examiner* — Olivia A Jones
(74) *Attorney, Agent, or Firm* — Buchanan Ingersoll & Rooney PC

(57)          ABSTRACT

A battery arrangement for a motor vehicle includes a battery housing and battery cells. The battery housing has a wall which runs around at least on four sides and encloses an interior of the battery housing. The battery housing has a separating web which divides the interior into two chambers. The battery housing has a preferred direction in which the encircling wall and the separating web extend. Battery cells are arranged in the two chambers. The battery housing is composed of one profile element that is T-shaped in section and two profile elements that are L-shaped in section, so that the profile elements form the encircling wall and the separating web.

7 Claims, 4 Drawing Sheets

(58) Field of Classification Search
    CPC ............ H01M 50/289; H01M 50/291; H01M
                 2220/20; H01M 50/40; H01M 50/409
    See application file for complete search history.

(56) References Cited

U.S. PATENT DOCUMENTS

| | | | |
|---|---|---|---|
| 11,223,080 B2 | 1/2022 | Kellner et al. | |
| 2015/0050539 A1 * | 2/2015 | Peterl ................ | H01M 10/6563 |
| | | | 429/130 |
| 2017/0365888 A1 | 12/2017 | Kwon et al. | |
| 2020/0259139 A1 * | 8/2020 | Nomizo .............. | H01M 50/209 |
| 2020/0384868 A1 | 12/2020 | Kellner et al. | |
| 2021/0005855 A1 | 1/2021 | Gotz et al. | |

FOREIGN PATENT DOCUMENTS

| | | | | |
|---|---|---|---|---|
| CN | 112054135 A * | 12/2020 | .............. | B60L 50/64 |
| DE | 102013218038 A1 * | 3/2015 | .............. | B60L 50/64 |
| DE | 102017201710 A1 | 8/2018 | | |
| DE | 102017005401 A1 * | 12/2018 | .............. | B60L 50/66 |
| DE | 102017119465 A1 * | 2/2019 | .............. | B60K 1/04 |
| DE | 102017127807 A1 | 5/2019 | | |
| DE | 102018103713 A1 | 8/2019 | | |
| WO | WO-0036692 A1 * | 6/2000 | .......... | H01M 50/247 |
| WO | 2019206409 A1 | 10/2019 | | |

OTHER PUBLICATIONS

Merriam Webster Definition of "Between", Accessed May 14, 2025.*
Machine Translation Relied Upon for DE-102017005401-A1 (Year: 2018).*
OED Definition of "Chamfer" (Accessed: Sep. 10, 2025).*
Machine Translation Relied Upon for CN-112054135-A.*
Machine Translation Relied Upon for CN-101521294-A.*
Machine Translation Relied Upon for DE-102013218038-A1.*
Machine Translation Relied Upon for DE-102017005401-A1.*
English translation of the Chinese Office Action for Chinese Application No. 202210526319.2, issued Dec. 25, 2023, 7 pages.
English translation of the Chinese Office Action (The Second Office Action) issued May 8, 2024, by the China National Intellectual Property Administration in corresponding Chinese Patent Application No. 202210526319.2. (7 pages).

* cited by examiner

BATTERY ARRANGEMENT AND METHOD FOR PRODUCING A BATTERY ARRANGEMENT

CROSS-REFERENCE TO RELATED APPLICATION

This application claims priority to German Patent Application No. 10 2021 112 775.0, filed May 18, 2021, the content of such application being incorporated by reference herein in its entirety.

FIELD OF THE INVENTION

The invention relates to a battery arrangement, in particular for a motor vehicle, and to a method for producing a battery arrangement.

BACKGROUND OF THE INVENTION

A variety of battery arrangements are disclosed in the prior art, for example by DE 10 2018 103 713 A1, US 2017/0365888 A1 or WO 2019/206409 A1, which are each incorporated by reference herein. In battery arrangements of this kind, which can be used on their own or else multiply in a vehicle battery, the question of effective assembly and safety of the battery cells under the action of force in the event of an accident etc. is of high importance. The battery arrangements disclosed in the prior art are still lacking in this respect.

SUMMARY OF THE INVENTION

Described herein is a battery arrangement which is simple to produce and is safe in respect of external forces. A further object is to specify a method for producing a battery arrangement, so that the battery arrangement can be produced in a more simple and more cost-effective manner.

One exemplary embodiment of the invention relates to a battery arrangement, in particular for a motor vehicle, comprising a battery housing and comprising battery cells, wherein the battery housing has a wall which runs around at least on four sides and encloses an interior of the battery housing, wherein furthermore the battery housing has a separating web which divides the interior into two chambers, wherein the battery housing has a preferred direction in which the encircling wall and the separating web extend, wherein battery cells are arranged in the two chambers, wherein the battery housing is composed of one profile element that is T-shaped in section and two profile elements that are L-shaped in section, so that the profile elements form the encircling wall and the separating web. As a result, the battery arrangement comprising the battery cells and the battery housing can be assembled in a simple manner and nevertheless a robust structure which protects the battery cells in the event of introduction of external force can be created.

In a further exemplary embodiment, it is expedient when the battery housing has two mutually opposite first side walls and two mutually opposite second side walls, wherein the first side walls are arranged perpendicularly to the second side walls and wherein the separating web is arranged parallel to the two second side walls and perpendicularly to the first side walls. This achieves a robust structure which reliably protects the battery cells arranged in the interior.

It is also expedient when the profile element that is T-shaped in section forms a first side wall and the separating web and when the two profile elements that are L-shaped in section each form a second side wall and together form a first side wall. In this way, a robust structure can be created which can be simply composed of three essential parts and optionally further auxiliary elements.

It is also expedient when the profile element that is T-shaped in section has a first limb and a second limb protruding from the center of said first limb, wherein a third limb is optionally arranged on the end side of the second limb, the second limb standing centrally on said third limb. The third limb promotes good connectability of the T-shaped profile. In particular, the length of the third limb is considerably shorter than that of the first limb, which forms a side wall.

It is also advantageous when the profile elements that are L-shaped in section are arranged with mirror-image symmetry with respect to one another and each have a fourth limb and a fifth limb protruding perpendicularly from said fourth limb, wherein a sixth limb optionally protrudes from the end side of the fifth limb in each case. In this case, the sixth limb protrudes from the fifth limb parallel to the fourth limb and preferably promotes better connectability of the profile elements. In this case, the sixth limb is considerably shorter than the fourth limb, which substantially forms half of a side wall.

It is also advantageous when the third limb establishes a sealing connection together with the fourth limbs and when the sixth limbs each establish a sealing connection with the first limb. As a result, a sealed battery housing can be formed, the end side(s) of which can optionally be closed by a battery housing cover or by two battery housing covers.

The object in respect of the method is achieved by the features of claim 7.

One exemplary embodiment of the invention relates to a method for producing a battery arrangement, in particular as claimed in one of the preceding claims, wherein a battery arrangement, in particular for a motor vehicle, comprising a battery housing and comprising battery cells is assembled, wherein the battery housing has a wall which runs around at least on four sides and encloses an interior of the battery housing, wherein furthermore the battery housing has a separating web which divides the interior into two chambers, wherein the battery housing has a preferred direction in which the encircling wall and the separating web extend, wherein battery cells are arranged in the two chambers, wherein the battery housing is composed of one profile element that is T-shaped in section and two profile elements that are L-shaped in section, so that the profile elements form the encircling wall and the separating web.

It is advantageous when the production is performed in the following steps:

providing two profile elements that are L-shaped in section, optionally applying a gap-filling material to a limb of the respective L-shaped profile element, positioning rows of battery cells on the respective gap-filling material and/or on the L-shaped profile element, placing a connection panel between rows of battery cells, placing and connecting a respective electrical connection element for connecting the battery cells of the respective L-shaped profile element, optionally applying a gap-filling material to the connection elements, feeding the T-shaped profile element between the two L-shaped profile elements, pushing together the two L-shaped profile elements containing the battery cells and the T-shaped profile element arranged between them, pressing in the profile elements and joining the interfaces between the profile elements.

As a result, simplified production of the battery arrangement can be performed because the battery cells can be easily and securely positioned on the L-shaped profile elements and then the battery housing can be formed and closed by joining together the profile elements.

This achieves a robust structure which is very robust in particular in the longitudinal direction of the profile elements.

It is particularly advantageous when the joining is performed by adhesive bonding and/or welding. This allows a robust and also sealing connection to be made.

It is also advantageous when at least one battery housing cover is placed onto the end side(s) of the battery housing, in particular two battery housing covers are placed onto both end sides. This firstly allows provision for an electrical connection and/or a fluidic connection in order to control the temperature of the battery arrangement using a fluid. As an alternative, the electrical connection and/or the fluid connection can also be made on a side wall, for example.

BRIEF DESCRIPTION OF THE DRAWINGS

The invention will be explained in detail below on the basis of an exemplary embodiment with reference to the drawing, in which.

DETAILED DESCRIPTION OF THE INVENTION

Figures 1, 2, 3:
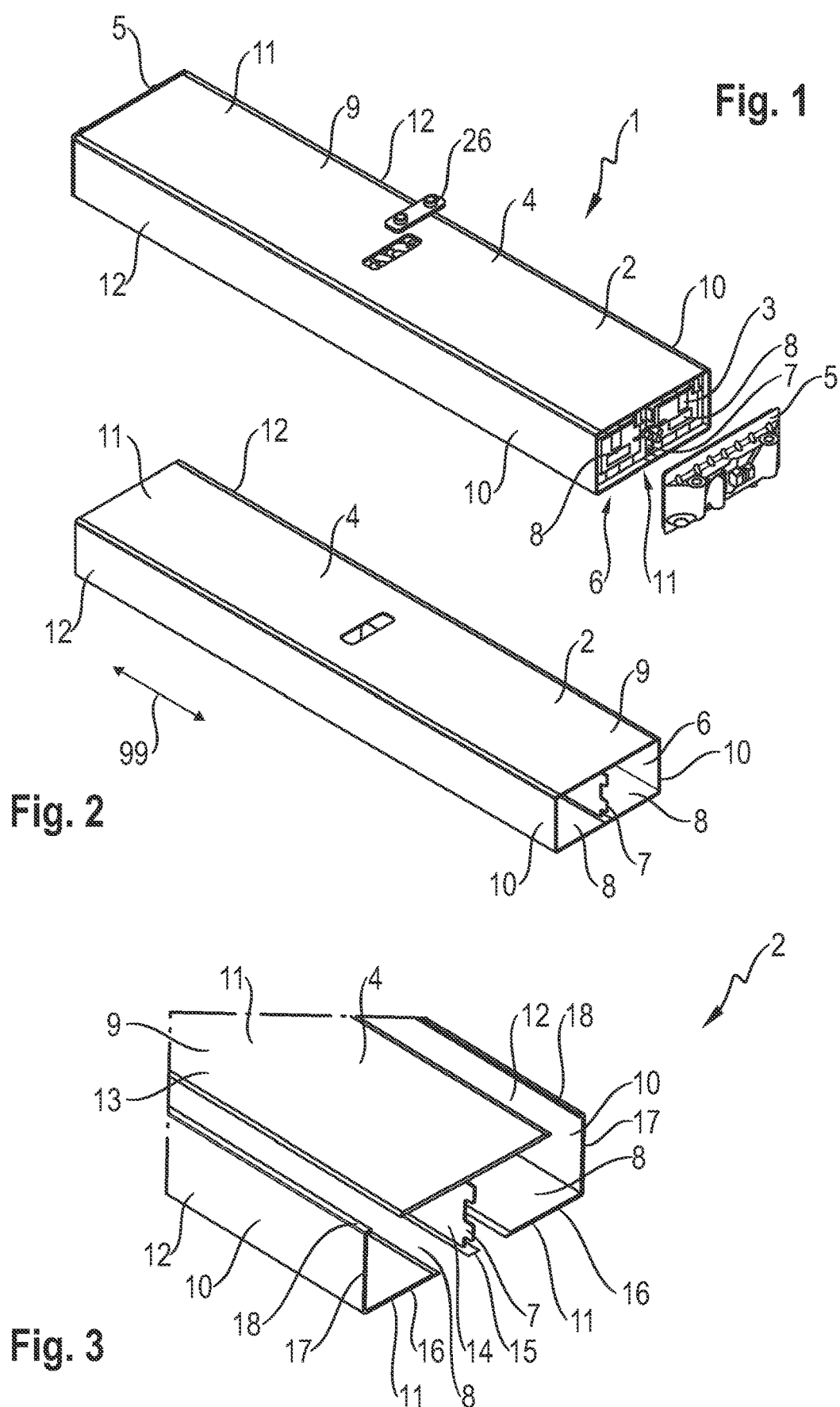
FIG. 1 shows a schematic illustration of an exemplary embodiment of a battery cell arrangement according to aspects of the invention.
FIG. 2 shows a schematic illustration of the battery housing according to FIG. 1.
FIG. 3 shows a schematic illustration of a detail of the battery housing according to FIG. 2.

FIGS. 1 to 3 show various schematic illustrations of an exemplary embodiment of a battery arrangement 1 according to aspects of the invention which can be used in particular as a module of a traction battery of a motor vehicle or which, as an alternative, can also be used as a battery, as well as a traction battery, for example, of a motor vehicle. FIGS. 4 to 9 serve to explain a method for producing a battery arrangement 1 in line with the concept according to aspects of the invention.

FIGS. 1 to 3 show an exemplary embodiment of a battery arrangement 1 which is equipped with a battery housing 2 and with battery cells 3 arranged in said battery housing.

The battery housing 2 has a wall 4 which runs around at least on four sides and can be closed off on the end sides by means of battery housing covers 5, for example. In this case, the wall 4 encloses an interior 6 of the battery housing 2. The battery cells 3 are arranged in the interior 6 of the battery housing 2.

The battery housing 2 has a separating web 7 which divides the interior 6 of the battery housing 2 into two chambers 8.

The battery housing 2 has a preferred direction 99, which is the longitudinal direction of the battery housing 2, for example. The encircling wall 4 and the separating web 7 extend in this preferred direction 99.

FIG. 1 shows that the battery cells 3 are arranged in the two chambers 8.

The exemplary embodiment according to aspects of the invention shows that the battery housing 2 is composed of one profile element 9 that is T-shaped in section and two profile elements 10 that are L-shaped in section, so that the profile elements 9, 10 form the encircling wall 4 and the separating web 7.

In this case, the battery housing 2 has two mutually opposite first side walls 11 and two mutually opposite second side walls 12, wherein the first side walls 11 are arranged perpendicularly to the second side walls 12 and wherein the separating web 7 is arranged parallel to the two second side walls 12 and perpendicularly to the first side walls 11.

FIGS. 1 to 3 show that the profile element 9 that is T-shaped in section forms a first side wall 11 and the separating web 7 and that the two profile elements 10 that are L-shaped in section each form a second side wall 12 and together form a first side wall 11.

Figure 9:
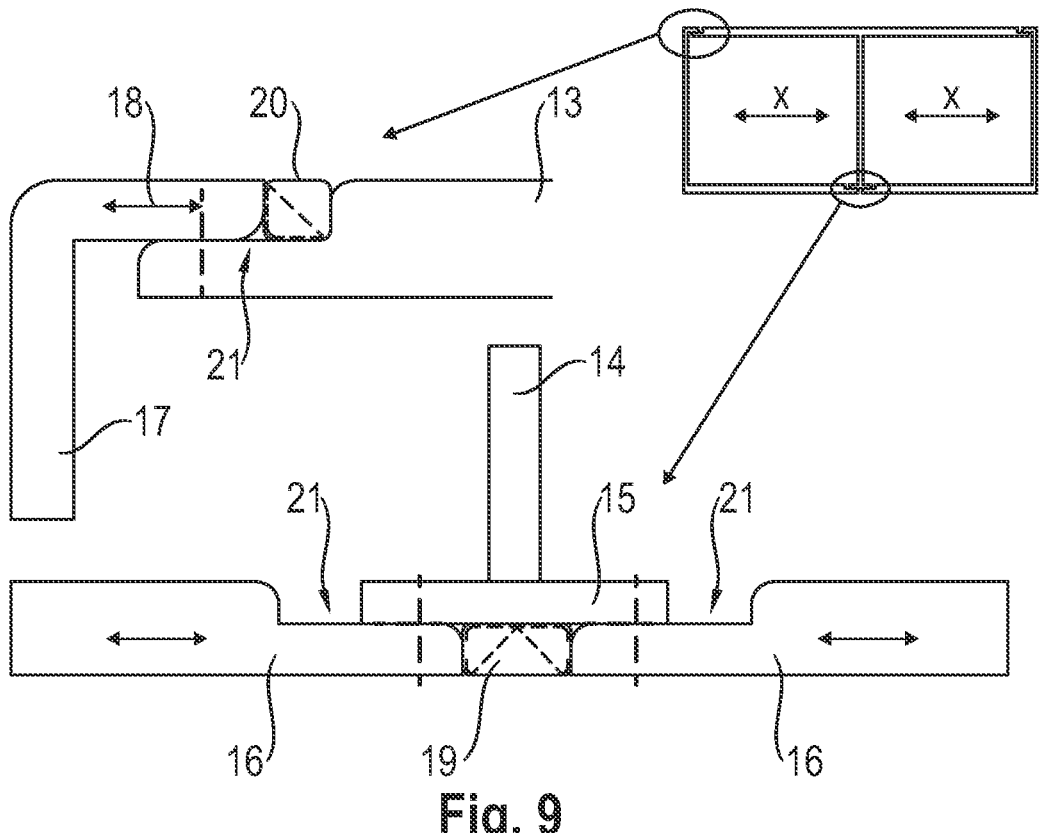
FIG. 9 shows a schematic illustration for explaining the connection of the profile elements.

The profile element 9 that is T-shaped in section has a first limb 13 and a second limb 14 protruding from the center of said first limb, wherein a third limb 15 is optionally arranged on the end side of the second limb 14, the second limb 14 standing centrally on said third limb as the separating web 7, also see FIG. 9.

The profile elements 10 that are L-shaped in section are arranged with mirror-image symmetry with respect to one another, see FIG. 3. They each have a fourth limb 16 and a fifth limb 17 protruding perpendicularly from said fourth limb, wherein a sixth limb 18 optionally protrudes from the end side of the fifth limb 17 in each case.

In this case, the third limb 15 establishes a sealing connection 19 together with the fourth limbs 16 and/or the sixth limbs 18 each establish a sealing connection 20 with the first limb 13, also see FIG. 9. In order not to increase the wall thickness of the wall 4 in the region of the connections 19, 20, the limbs 13, 18, 15 and 16 can have a chamfer 21 in which the respective wall thickness of the limb 13 to 18 is reduced in comparison to the normal wall thickness of the limbs 13 to 18.

The connection 19, 20 can preferably and for example be an adhesive connection or a welded connection, that is to say in particular a cohesively bonded connection. As an alternative or in addition, there may also be provision for an interlocking connection.

The method according to aspects of the invention for producing a battery arrangement 1 provides for a battery housing 2 containing the battery cells 3 to be assembled. In this case, the battery housing 2 is composed of one profile element 9 that is T-shaped in section and two profile elements 10 that are L-shaped in section and the battery cells are assembled. Reference is made to FIGS. 4 to 9 in this respect.

Figure 4:
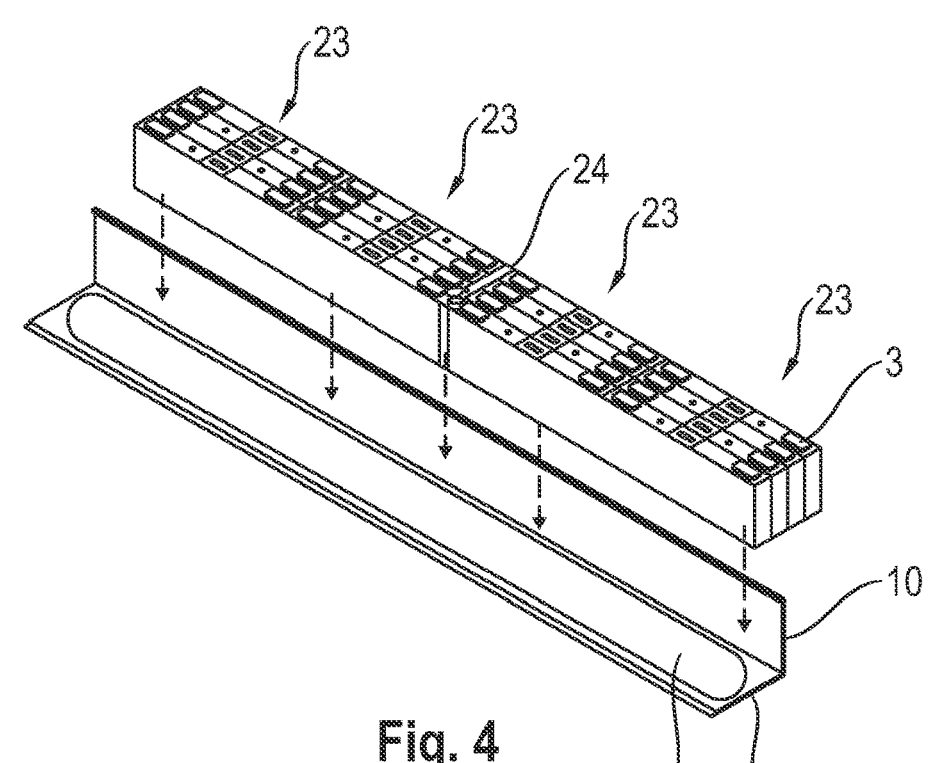
FIG. 4 shows a schematic illustration for explaining the production of the battery arrangement.

The production method provides for the following steps:

providing two profile elements 10 that are L-shaped in section, see FIG. 4, wherein a gap-filling material 22, what is known as a gap filler, is optionally applied to a limb 16 of the profile element 10. After this, rows 23 of battery cells 3 are positioned on the respective gap-filling material 22 and/or on the L-shaped profile element 10. According to FIG. 4, a connection panel 24 is also placed between rows 23 of battery cells 3.

In this case, preferably some, here four, battery cells 3 of a row 23 are adhesively bonded to one another by means of so-called compression cushions and placed onto the L-shaped profile element 10.

Figure 5:
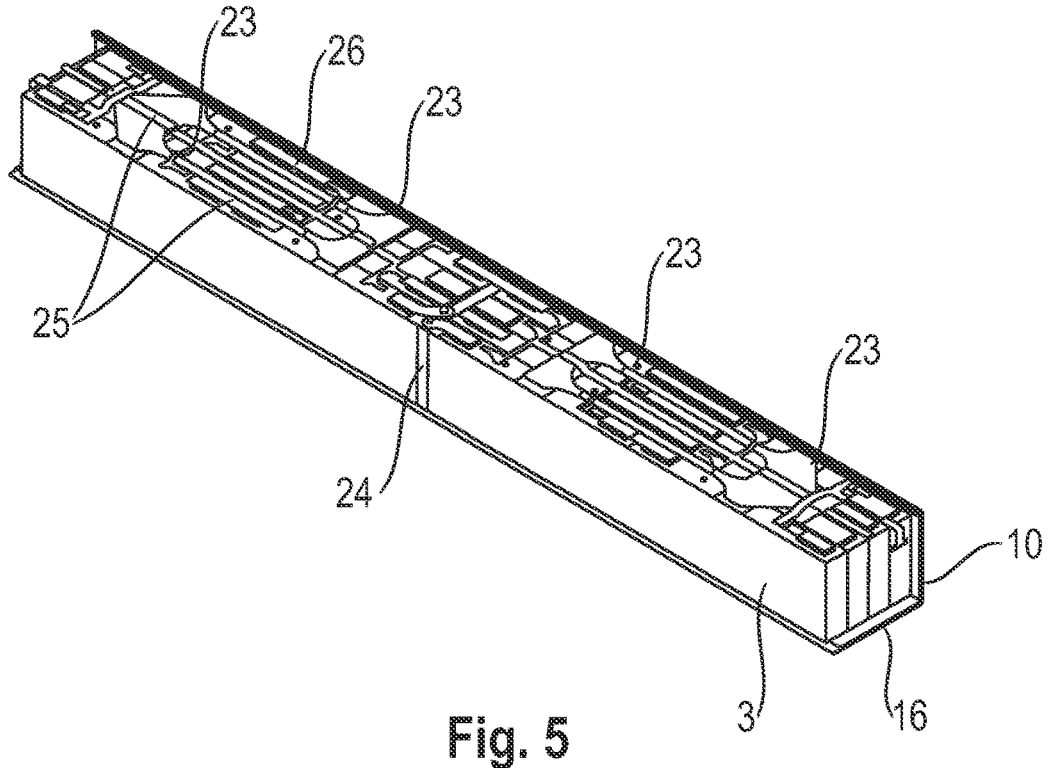
FIG. 5 shows a schematic illustration for explaining the production of the battery arrangement.

In FIG. 5, a respective electrical connection element 25, such as a busbar, in particular including a degassing channel, for connecting the battery cells 3 of the respective L-shaped profile element 10 is placed and connected. The fastening and connection can be performed, for example, by means of welding.

Figure 6:
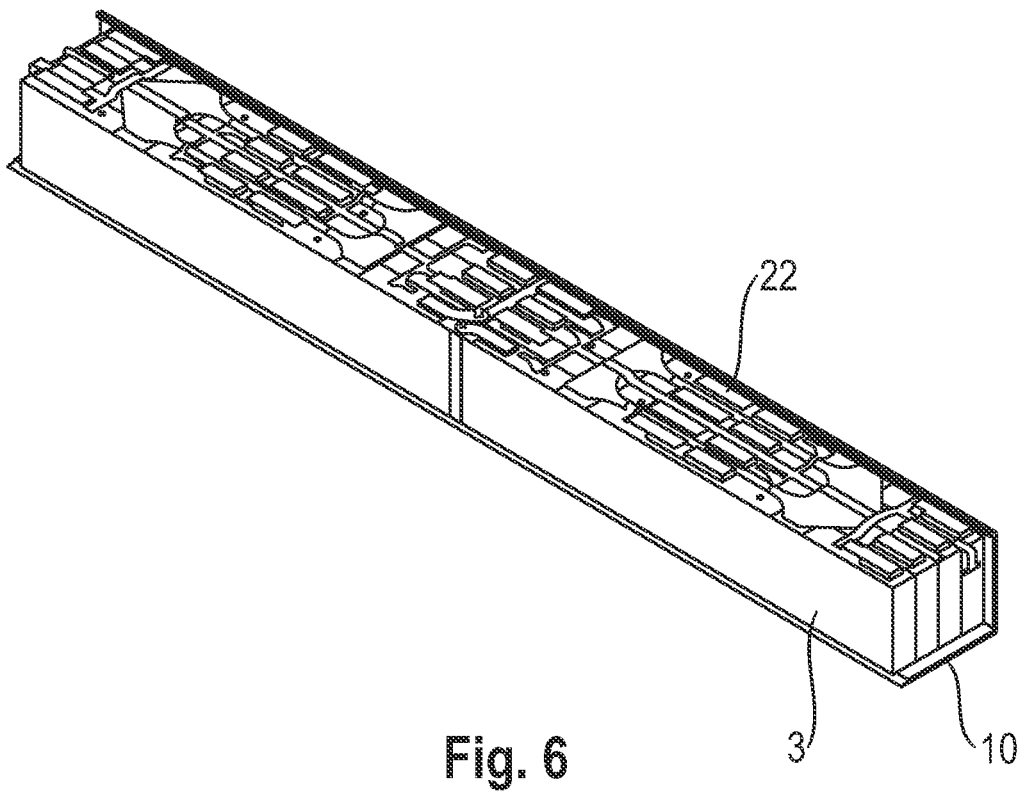
FIG. 6 shows a schematic illustration for explaining the production of the battery arrangement.

According to FIG. 6, a gap-filling material 22 can then optionally be applied to the connection elements 25.

Figure 7:
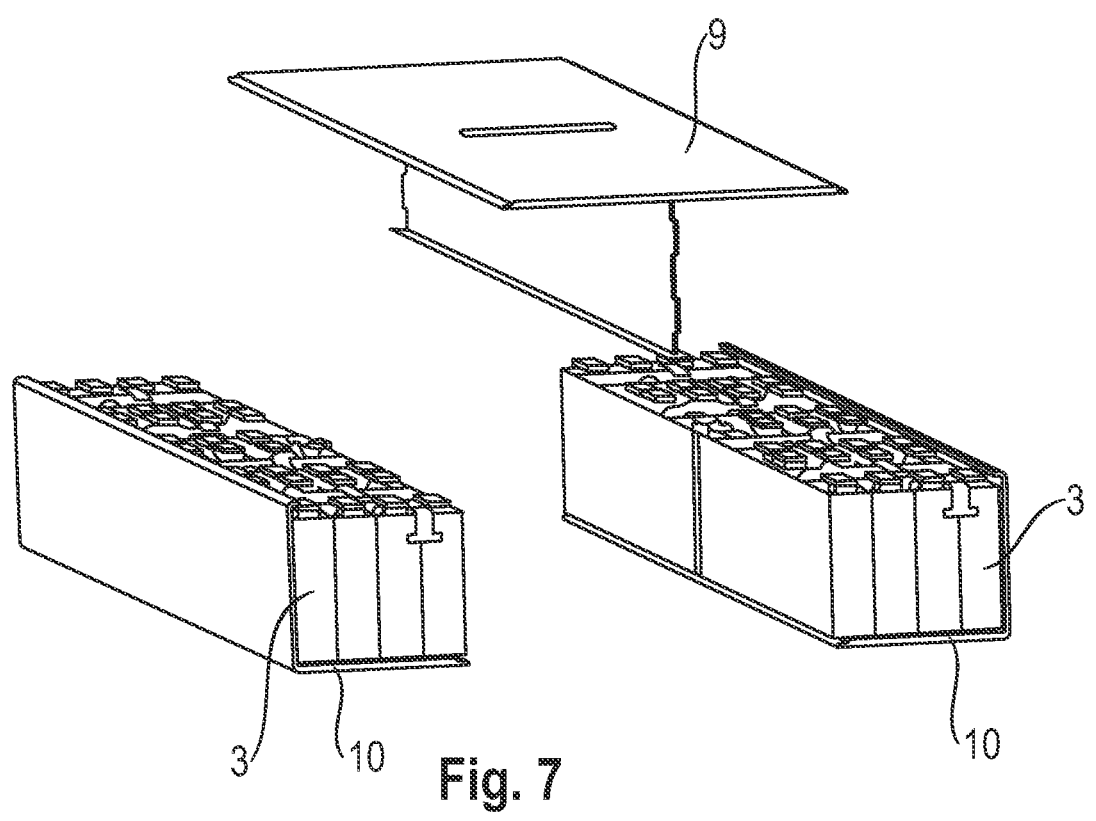
FIG. 7 shows a schematic illustration for explaining the production of the battery arrangement.

According to FIG. 7, after two L-shaped profile elements 10 have been formed according to FIGS. 4 to 6, the T-shaped profile element 9 is fed between the two L-shaped profile elements 10 containing the battery cells 3.

Figure 8:
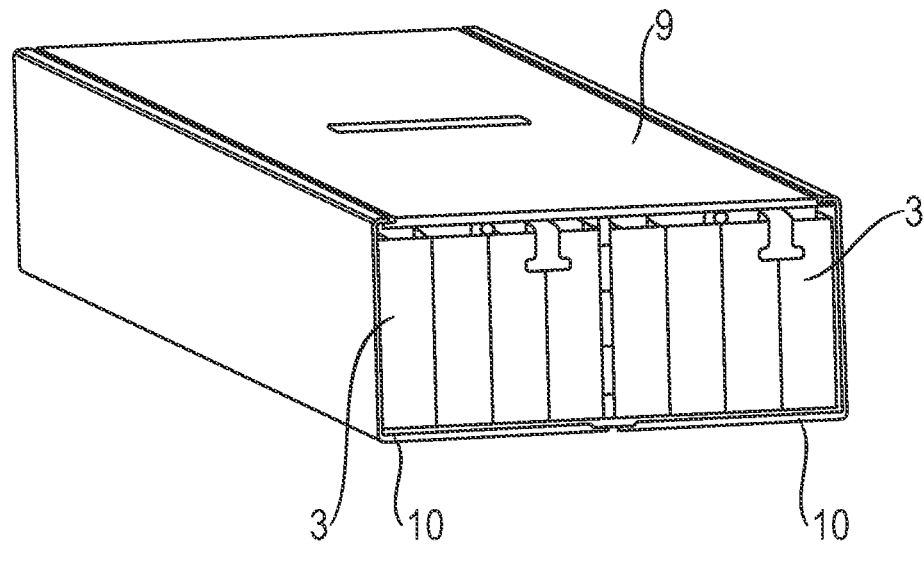
FIG. 8 shows a schematic illustration for explaining the production of the battery arrangement.

Thereafter, the two L-shaped profile elements 10 containing the battery cells 3 and the T-shaped profile element 9 arranged between them are pushed together, see FIG. 8. Then, the profile elements 9, 10 are pressed in and the interfaces between the profile elements 9, 10 are joined, see FIG. 9.

The joining is advantageously performed in a cohesively bonded and/or interlocking manner. For example, the joining is performed by adhesive bonding and/or welding.

Then, at least one battery housing cover 5 or two battery housing covers 5 can be placed onto the end side(s) of the battery housing 2, also see FIG. 1.

FIG. 1 also shows that there is provision for a connection 26 in the side wall 11.

LIST OF REFERENCE SIGNS

1 Battery arrangement
2 Battery housing
3 Battery cell
4 Wall
5 Battery housing cover
6 Interior
7 Separating web
8 Chamber
9 T-shaped profile element
10 L-shaped profile element
11 First side wall
12 Second side wall
13 First limb
14 Second limb
15 Third limb
16 Fourth limb
17 Fifth limb
18 Sixth limb
19 Connection
20 Connection
21 Chamfer

22 Material
23 Row
24 Connection panel
25 Connection element
26 Connection
99 Preferred direction

What is claimed is:

1. A battery arrangement for a motor vehicle, the battery arrangement comprising:

a battery housing that includes (i) encircling walls which run around at least on four sides and enclose an interior of the battery housing, and (ii) a separating web which divides the interior into two chambers; and battery cells arranged in the two chambers, wherein the encircling walls and the separating web extend in a direction, wherein the battery housing is composed of one profile element that is T-shaped in section and two profile elements that are L-shaped in section, wherein the three profile elements are cohesively bonded together such that the three profile elements form the encircling walls and the separating web, wherein the profile element that is T-shaped in section has a first limb forming a top wall of the battery housing, a second limb protruding from a center of said first limb to form the separating web, and a third limb arranged on an end side of the second limb, the second limb standing centrally on said third limb, wherein the profile elements that are L-shaped in section are arranged with mirror-image symmetry with respect to one another, wherein each profile element that is L-shaped has a fourth limb forming a portion of a lower wall of the battery housing, and a fifth limb protruding perpendicularly from said fourth limb to form a side wall of the battery housing, wherein the third limb is connected to and positioned between the fourth limbs of the profile elements that are L-shaped, wherein each end of the third limb is positioned within a chamfer that is formed at a free end of one of the fourth limbs.

2. The battery arrangement as claimed in claim 1, wherein the side walls of the battery housing are arranged perpendicularly to the top and bottom walls of the battery housing and wherein the separating web is arranged parallel to the side walls and perpendicularly to the top and bottom walls.

3. The battery arrangement as claimed in claim 1, wherein the profile elements that are L-shaped in section each include a sixth limb protruding from an end side of the fifth limb.

4. The battery arrangement as claimed in claim 3, wherein the third limb establishes a sealing connection together with the fourth limbs, and wherein the sixth limbs each establish a sealing connection with the first limb.

5. The battery arrangement as claimed in claim 1, wherein the first and third limbs extend in a same direction.

6. The battery arrangement as claimed in claim 4, wherein the sixth limbs are positioned over the top wall of the battery housing.

7. The battery arrangement as claimed in claim 4, wherein for each of the profile elements that are L-shaped in section, the fourth and sixth limbs extend in a same direction.

* * * * *